US012621073B2

(12) United States Patent
Lyu et al.

(10) Patent No.: US 12,621,073 B2
(45) Date of Patent: May 5, 2026

(54) METHOD AND APPARATUS FOR DETERMINING CLOCK, AND STORAGE MEDIUM

(71) Applicant: HUAWEI TECHNOLOGIES CO., LTD., Shenzhen (CN)

(72) Inventors: Jingfei Lyu, Wuhan (CN); Fanshun Meng, Wuhan (CN); Jinhui Wang, Dongguan (CN); Wei Su, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 354 days.

(21) Appl. No.: 18/492,506

(22) Filed: Oct. 23, 2023

(65) Prior Publication Data

US 2024/0056209 A1      Feb. 15, 2024

Related U.S. Application Data

(63) Continuation of application No. PCT/CN2022/086985, filed on Apr. 15, 2022.

(30) Foreign Application Priority Data

Apr. 23, 2021    (CN) .......................... 202110443130.2
May 31, 2021    (CN) .......................... 202110605060.6

(51) Int. Cl.
        *H04J 3/06*                (2006.01)
(52) U.S. Cl.
        CPC .................................. *H04J 3/0658* (2013.01)
(58) Field of Classification Search
        CPC ...... H04J 3/0641; H04J 3/0658; H04J 3/0688; H04J 3/0697; H04J 3/1658
        (Continued)

(56) References Cited

U.S. PATENT DOCUMENTS 7,613,212 B1 * 11/2009 Raz ........................ H04J 3/0641
                                                                        370/510
2012/0213508 A1 * 8/2012 Moynihan ............. H04J 3/0682
                                                                        398/154
(Continued)

FOREIGN PATENT DOCUMENTS

WO          2022100110 A1      5/2022

OTHER PUBLICATIONS

Trowbridge et al., "Flex Ethernet Implementation Agreement 2.1," Physical and Link Layer, IA OIF FLEXE-02.1, total 56 pages (Jul. 2019).

(Continued)

*Primary Examiner* — Robert J Lopata
(74) *Attorney, Agent, or Firm* — Leydig, Voit & Mayer, Ltd.

(57)            ABSTRACT

A method and an apparatus are provided for determining a network device receiving a first signal and at least one second signal, wherein the first signal carries data to be sent through a first flexible Ethernet interface. A first physical layer clock is determined based on the first signal. A second physical layer clock is determined based on the at least one second signal or the first physical layer clock and the at least one second signal. The first physical layer clock or the second physical layer clock is used as a sending clock of a non-flexible Ethernet interface. The network device includes the first flexible Ethernet interface and the non-flexible Ethernet interface.

20 Claims, 9 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2019/0165874 | A1* | 5/2019 | Chen | H04J 3/0638 |
| 2020/0177361 | A1 | 6/2020 | Gareau et al. | |
| 2020/0336283 | A1* | 10/2020 | Zhong | H04J 3/1611 |
| 2021/0409140 | A1* | 12/2021 | Lv | H04L 7/0012 |
| 2022/0247505 | A1* | 8/2022 | Li | H04J 3/0697 |
| 2022/0329316 | A1* | 10/2022 | Yan | H04B 10/07955 |
| 2023/0362854 | A1* | 11/2023 | Zhang | H04J 3/0688 |

OTHER PUBLICATIONS

"Series G: Transmission Systems and Media, Digital Systems and Networks Packet over Transport aspects—Synchronization, quality and availability targets, Series Y: Global Information Infrastructure, Internet Protocol Aspects, Next-Generation Networks, Internet of Things and Smart Cities Internet protocol aspects—Transport, Distribution of timing information through packet networks," Recommendation ITU-T G.8264/Y. 1364, International Telecommunication Union, total 42 pages (Aug. 2017).

"Series G: Transmission Systems and Media, Digital Systems and Networks Digital terminal equipments—General Series Y: Global Information Infrastructure, Internet Protocol Aspects, Next-Generation Networks, Internet of Things and Smart Cities Internet protocol aspects—Transport, Interfaces for the optical transport network," Recommendation ITU-T G.709/Y. 1331, total 280 pages, International Union of Telecommunication, Geneva, Switzerland (Jun. 2020).

"Series G: Transmission Systems and Media, Digital Systems and Networks Packet over Transport aspects—Mobile network transport aspects, Interfaces for metro transport networks," Recommendation ITU-T G.8312, total 30 pages, International Union of Telecommunication, Geneva, Switzerland (Dec. 2020).

* cited by examiner

METHOD AND APPARATUS FOR DETERMINING CLOCK, AND STORAGE MEDIUM

CROSS-REFERENCE TO RELATED APPLICATIONS

This application is a continuation of International Application No. PCT/CN2022/086985 filed on Apr. 15, 2022, which claims priority to Chinese Patent Application No. 202110443130.2, filed on Apr. 23, 2021 and Chinese Patent Application No. 202110605060.6, filed on May 31, 2021. All of the aforementioned patent applications are hereby incorporated by reference in their entireties.

TECHNICAL FIELD

Embodiments of this application relate to the field of communication, and in particular, to a method and an apparatus for determining a clock, and a storage medium.

BACKGROUND

An edge device of an optical transport network (OTN) includes an optical transport unit (OTU) interface, a flexible Ethernet (FlexE) interface, and at least one non-flexible Ethernet interface. The at least one non-flexible Ethernet interface includes a first non-flexible Ethernet interface and a second non-flexible Ethernet interface. The edge device communicates with the OTN through the OTU interface, receives flexible Ethernet data and/or non-flexible Ethernet data through the OTU interface, and receives the non-flexible Ethernet data through the first non-flexible Ethernet interface. The edge device further sends the received flexible Ethernet data through the flexible Ethernet interface, sends the non-flexible Ethernet data through the second non-flexible Ethernet interface, or sends, through the second non-flexible Ethernet interface, non-flexible Ethernet data generated by the edge device.

The edge device includes a local crystal oscillator. The edge device uses a clock generated by the local crystal oscillator as a sending clock of the second non-flexible Ethernet interface. In other words, based on the clock generated by the local crystal oscillator, the edge device sends the received non-flexible Ethernet data through the second non-flexible Ethernet interface, or sends, through the second non-flexible Ethernet interface, the non-flexible Ethernet data generated by the edge device. Because the edge device usually uses the clock generated by the local crystal oscillator to send the non-flexible Ethernet data through the second non-flexible Ethernet interface, the edge device cannot continue transmitting a clock of an upstream device through the second non-flexible Ethernet interface.

SUMMARY

This application provides a method and an apparatus for determining a clock, and a storage medium, so that a network device can use a clock of an upstream device as a sending clock of a non-flexible Ethernet interface. Technical solutions are as follows:

According to a first aspect, this application provides a method for determining a clock. In the method, a first network device receives a first signal and at least one second signal, where the first signal carries data to be sent through a first flexible Ethernet interface. The first network device determines a first physical layer clock based on the first signal. The first network device determines a second physical layer clock based on the at least one second signal or the first physical layer clock and the at least one second signal. The first network device uses the first physical layer clock or the second physical layer clock as a sending clock of a non-flexible Ethernet interface. The first network device includes the first flexible Ethernet interface and the non-flexible Ethernet interface.

In the method, the first network device determines the second physical layer clock based on the at least one second signal or the first physical layer clock and the at least one second signal. Because the second physical layer clock is determined based on the first signal, and both the first signal and the at least one second signal are signals received by the first network device, the first physical layer clock or the second physical layer clock is used as the sending clock of the non-flexible Ethernet interface. Therefore, the sending clock of the non-flexible Ethernet interface is obtained based on a signal (the first signal or the second signal) received by the first network device. In this way, the first network device may use a clock of an upstream device that sends the signal as the sending clock of the non-flexible Ethernet interface, so that the clock of the upstream device continues to be transmitted through the non-flexible Ethernet interface.

In addition, in conventional technologies, a clock generated by a local crystal oscillator is used, and non-flexible Ethernet data is sent through a non-flexible Ethernet interface. However, in the method, because the sending clock of the non-flexible Ethernet interface is obtained based on the signal (the first signal or the second signal) received by the first network device, a clock generated based on the received signal is used as the sending clock of the non-flexible Ethernet interface. Therefore, the edge device may transmit the clock of the upstream device through the non-flexible Ethernet interface of the edge device, and improve precision of the sending clock of the non-flexible Ethernet interface of the edge device.

In a possible implementation, the first network device determines the second physical layer clock based on a physical layer clock quality level corresponding to the at least one second signal.

In another possible implementation, the first network device determines the second physical layer clock based on a physical layer clock priority corresponding to the at least one second signal.

In another possible implementation, the first network device determines the second physical layer clock based on a physical layer clock quality level corresponding to the first physical layer clock and a physical layer clock quality level corresponding to the at least one second signal.

In another possible implementation, the first network device determines the second physical layer clock based on a physical layer clock priority corresponding to the first physical layer clock and a physical layer clock priority corresponding to the at least one second signal.

In another possible implementation, the first network device uses the first physical layer clock as a sending clock of the first flexible Ethernet interface.

In another possible implementation, the first network device uses the first physical layer clock or the second physical layer clock as the sending clock of the non-flexible Ethernet interface according to a configuration command, to improve precision of the sending clock of the non-flexible Ethernet interface of the edge device.

In another possible implementation, the first network device uses the first physical layer clock or the second physical layer clock as the sending clock of the non-flexible Ethernet interface based on the physical layer clock quality level of the first physical layer clock and a physical layer clock quality level of the second physical layer clock. In this way, a physical layer clock with a highest physical layer clock quality level may be used as the sending clock of the non-flexible Ethernet interface, to improve precision of the sending clock of the non-flexible Ethernet interface of the edge device.

In another possible implementation, the first network device uses the first physical layer clock or the second physical layer clock as the sending clock of the non-flexible Ethernet interface based on the physical layer clock priority of the first physical layer clock and a physical layer clock priority of the second physical layer clock. In this way, a physical layer clock with a highest physical layer clock priority may be used as the sending clock of the non-flexible Ethernet interface, to improve precision of the sending clock of the non-flexible Ethernet interface of the edge device.

In another possible implementation, the first network device is an edge device of an optical transport network, and the first signal comes from the optical transport network.

In another possible implementation, a type of the first flexible Ethernet interface includes a flexible Ethernet FlexE, a slicing packet network SPN, or a metro transport network MTN.

In another possible implementation, a type of the non-flexible Ethernet interface includes an Ethernet interface, a synchronous digital hierarchy SDH, a synchronous optical network SONET, an optical supervisory channel OSC, or an optical transport unit OTU.

In another possible implementation, the first signal carries flexible Ethernet data received through a first OTU interface of the first network device.

In another possible implementation, any one of the at least one second signal carries overhead data received through the first OTU interface of the first network device.

In another possible implementation, any one of the at least one second signal carries data received through an OSC interface of the first network device.

In another possible implementation, any one of the at least one second signal carries data received through an Ethernet interface of the first network device.

According to a second aspect, this application provides an apparatus for determining a clock. The apparatus is configured to perform the method in any one of the first aspect or the possible implementations of the first aspect. Specifically, the apparatus includes units configured to perform the method in any one of the first aspect or the possible implementations of the first aspect.

According to a third aspect, this application provides an apparatus for determining a clock. The apparatus includes a processor and a memory. The processor and the memory may be connected through an internal connection. The memory is configured to store a program. The processor is configured to execute the program in the memory, so that the apparatus completes the method in any one of the first aspect or the possible implementations of the first aspect.

According to a fourth aspect, this application provides a computer program product. The computer program product includes a computer program stored in a computer-readable storage medium, and the computing program is loaded by a processor to implement the method in any one of the first aspect or the possible implementations of the first aspect.

According to a fifth aspect, this application provides a computer-readable storage medium, configured to store a computer program. The computer program is loaded by a processor to perform the method in any one of the first aspect or the possible implementations of the first aspect.

According to a sixth aspect, this application provides a chip, including a memory and a processor. The memory is configured to store computer instructions, and the processor is configured to invoke the computer instructions from the memory and run the computer instructions, to perform the method in any one of the first aspect or the possible implementations of the first aspect.

DESCRIPTION OF EMBODIMENTS

The following further describes in detail implementations of this application with reference to accompanying drawings.

Figure 1:
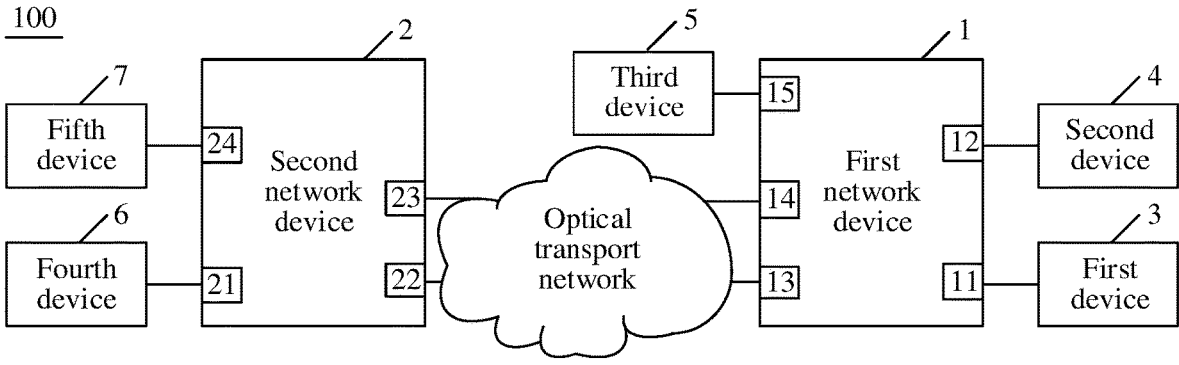
FIG. 1 is a schematic diagram of a structure of a network architecture according to an embodiment of this application.

Refer to FIG. 1. An embodiment of this application provides a network architecture 100, including:

a first network device 1 and a second network device 2, where the first network device 1 communicates with the second network device 2.

In some embodiments, both the first network device 1 and the second network device 2 are edge devices of an optical transport network.

The first network device 1 includes a first flexible Ethernet interface 11, at least one first non-flexible Ethernet interface 12, at least one first OTU interface 13, and a first optical supervisory channel (OSC) interface 14.

The first network device 1 communicates with the optical transport network through the at least one first OTU interface 13 and the first OSC interface 14, and the first network device 1 communicates with a first device 3 through the first flexible Ethernet interface 11. For any first non-flexible Ethernet interface in the at least one first non-flexible Ethernet interface 12, the first network device 1 communicates with a second device 4 through the first non-flexible Ethernet interface.

In some embodiments, the first device 3 is an independent device or network. For example, the first device 3 may be a slicing packet network (SPN), a router, or the like. The second device 4 is an independent device or network. For example, the second device 4 may be a synchronous digital hierarchy (SDH), an optical transport network device, a switch, a router, or the like.

In some embodiments, a type of the at least one first non-flexible Ethernet interface 12 includes one or more of an Ethernet interface, a synchronous digital hierarchy (SDH), a synchronous optical network (SONET), an OSC, an OTU, and the like.

In some embodiments, a type of the first flexible Ethernet interface 11 includes a FlexE, an SPN, a metro transport network (MTN), or the like.

In some embodiments, with reference to FIG. 1, the first network device 1 further includes at least one Ethernet interface 15. For any Ethernet interface in the at least one Ethernet interface 15, the first network device 1 communicates with a third device 5 through the Ethernet interface.

In some embodiments, the third device 5 is an independent device or network. For example, the third device 5 may be a switch, a router, or the like.

A type of the at least one Ethernet interface includes a gigabit Ethernet interface (gigabit Ethernet, GE) or an Ethernet interface with a higher rate, or the like.

Figure 2:
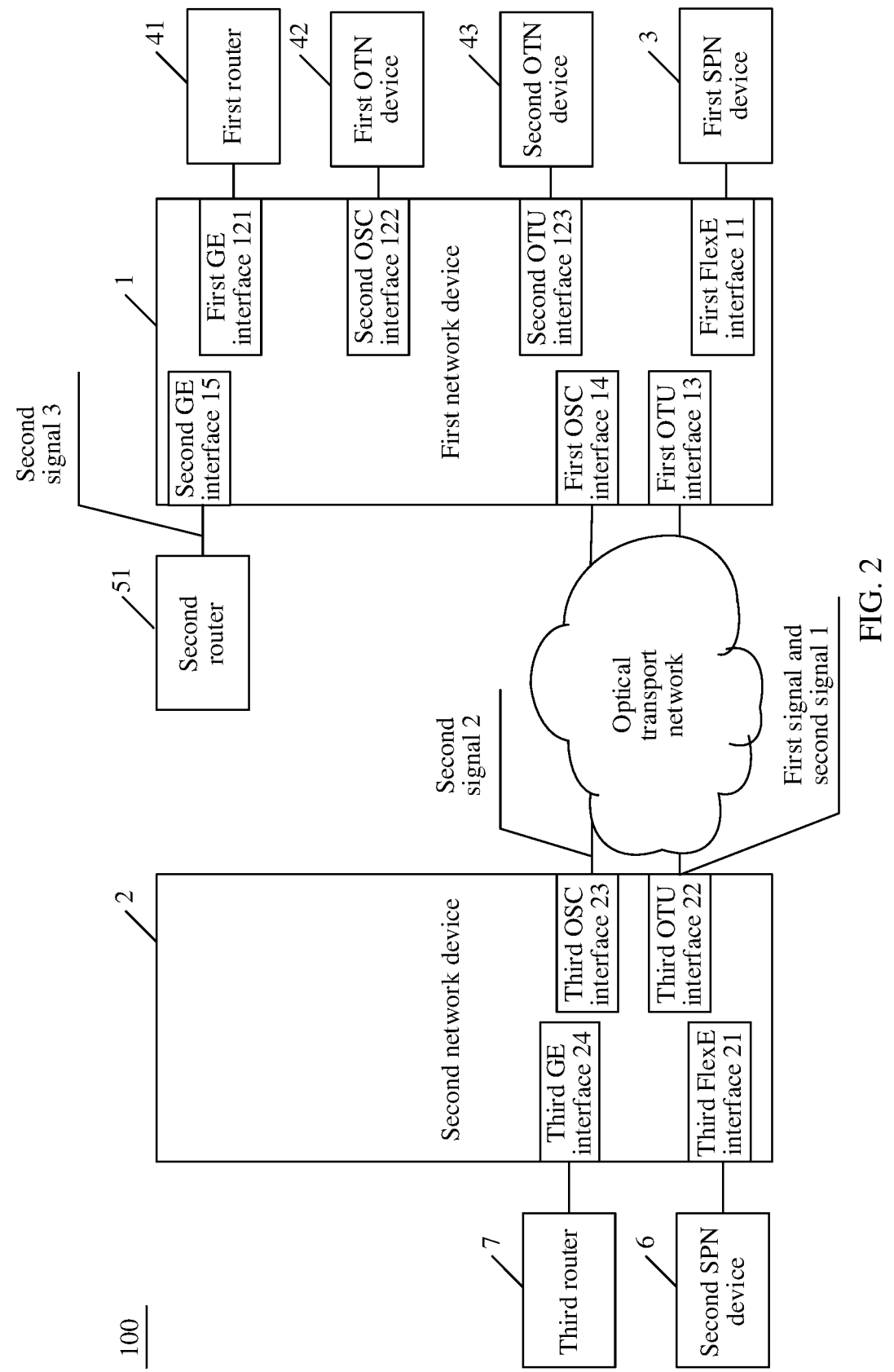
FIG. 2 is a schematic diagram of a structure of an example of a network architecture according to an embodiment of this application.

For example, with reference to FIG. 2, it is assumed that the first flexible Ethernet interface 11 is a first FlexE interface, and the first device 3 communicating with the first FlexE interface is a first SPN device 3. The at least one first non-flexible Ethernet interface 12 includes a first GE interface 121, a second OSC interface 122, and a second OTU interface 123. The second device 4 communicating with the first GE interface 121 is a first router 41, the second device 4 communicating with the second OSC interface 122 is a first OTN device 42, and the second device 4 communicating with the second OTU interface 123 is a second OTN device 43. The at least one Ethernet interface 15 includes a second GE interface 15, and the third device 5 communicating with the second GE interface 15 is a second router 51.

Refer to FIG. 1. The second network device 2 includes a third flexible Ethernet interface 21 and at least one third OTU interface 22. The second network device 2 communicates with the optical transport network through the at least one third OTU interface 22, and communicates with a fourth device 6 through the third flexible Ethernet interface 21.

In some embodiments, the second network device 2 further includes a third OSC interface 23 and/or at least one second non-flexible Ethernet interface 24.

The second network device 2 may alternatively communicate with the optical transport network through the third OSC interface 23. For any second non-flexible Ethernet interface in the at least one second non-flexible Ethernet interface 24, the second network device 2 communicates with a fifth device 7 through the second non-flexible Ethernet interface.

In some embodiments, the fourth device 6 is an independent device or network. For example, the fourth device 6 may be an SPN, a router, or the like. The fifth device 7 is an independent device or network. For example, the fifth device 7 may be a synchronous digital hierarchy (SDH), a switch, a router, or the like.

In some embodiments, a type of the at least one second non-flexible Ethernet interface 24 includes one or more of an Ethernet interface, an SDH, a SONET, an OSC, an OTU, and the like.

In some embodiments, a type of the third flexible Ethernet interface 21 includes a FlexE, an SPN, an MTN, or the like.

For example, with reference to FIG. 2, it is assumed that the third flexible Ethernet interface 21 is a third FlexE interface, the fourth device 6 communicating with the third FlexE interface 21 is a second SPN device. The at least one second non-flexible Ethernet interface 24 includes a third GE interface. The fifth device 7 communicating with the third GE interface 24 is a third router.

In the network architecture 100 shown in FIG. 1 or FIG. 2, the first network device 1 receives a first signal and at least one second signal. The first signal carries data to be sent through the first flexible Ethernet interface 11, and the data is flexible Ethernet data. For the first flexible Ethernet interface 11, the first network device 1 determines a first physical layer clock based on the first signal, and uses the first physical layer clock as a sending clock of the first flexible Ethernet interface 11. A second physical layer clock is determined based on the at least one second signal, or a second physical layer clock is determined based on the first physical layer clock and the at least one second signal, and the second physical layer clock is used as a sending clock of the at least one first non-flexible Ethernet interface 12. In addition, the first network device 1 sends the flexible Ethernet data based on the first physical layer clock through the first flexible Ethernet interface 11.

The first network device 1 includes a first clock module and a second clock module. The first physical layer clock is a clock signal generated by the first clock module, and the second physical layer clock is a clock signal generated by the second clock module.

In some embodiments, for any second signal, the second signal may carry non-flexible Ethernet data, and the second signal corresponds to one first non-flexible Ethernet interface 12. The first network device 1 sends the non-flexible Ethernet data based on the second physical layer clock through the first non-flexible Ethernet interface 12.

In some embodiments, for the foregoing first signal and the at least one second signal, the first network device 1 receives the first signal and the at least one second signal in the following manner.

The first network device 1 receives the first signal from the optical transport network through one first OTU interface 13, and receives the second signal from the optical transport network through one or more first OTU interfaces 13 of the at least one first OTU interface, and/or the first network device 1 receives the second signal from the optical transport network through the first OSC interface 14, and/or receives the second signal through the at least one Ethernet interface 15.

In some embodiments, the second network device 2 sends the first signal to the optical transport network through the third OTU interface 22, where the first signal carries the flexible Ethernet data, and sends the second signal to the optical transport network through the third OTU interface 22, where the second signal carries the non-flexible Ethernet data. The first signal received by the first network device 1 through the first OTU interface 13 includes the first signal sent by the second network device 2 through the third OTU interface 22. The second signal received by the first network device 1 through the first OTU interface 13 includes the second signal sent by the second network device 2 through the third OTU interface 22.

In some embodiments, the second network device 2 further includes a third OSC interface 23, and the second network device 2 may further send the second signal to the optical transport network through the third OSC interface 23. The second signal received by the first network device 1 through the first OSC interface 14 includes the second signal sent by the second network device 2 through the third OSC interface 23.

Figure 3:
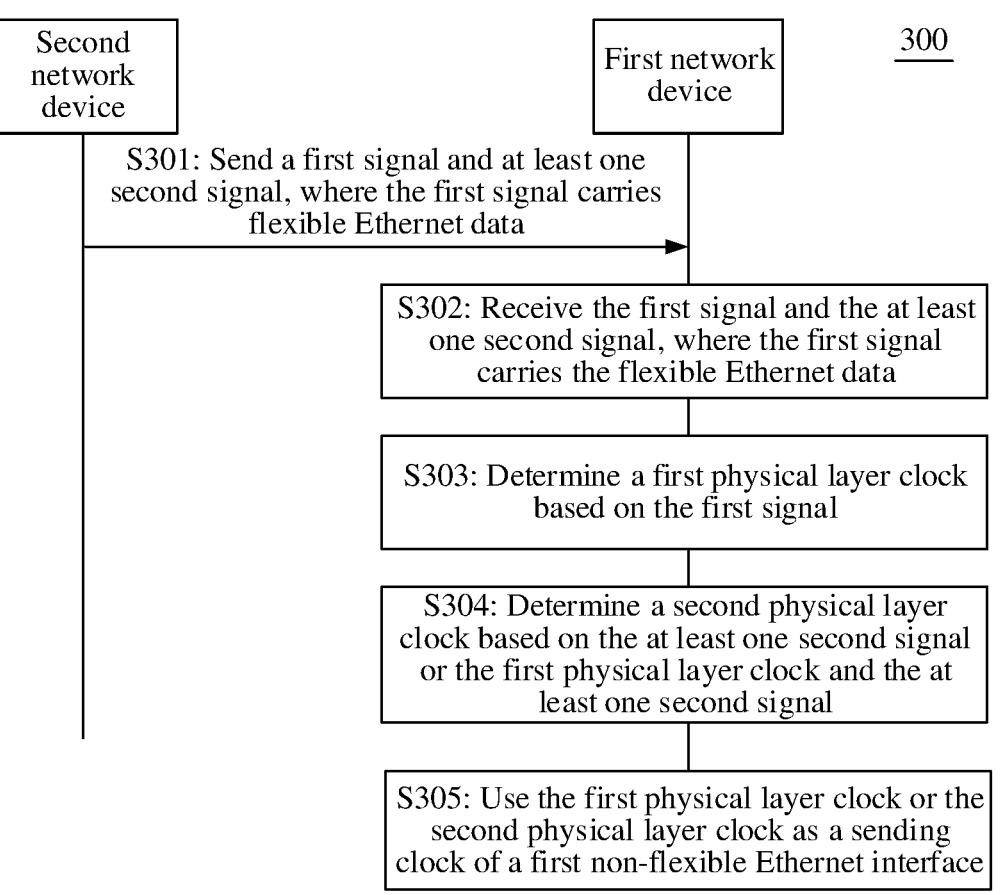
FIG. 3 is a flowchart of a method for determining a clock according to an embodiment of this application.

Refer to FIG. 3. An embodiment of this application provides a method 300 for determining a clock. The method 300 is applied to the network architecture 100 shown in FIG. 1 or FIG. 2, and includes the following steps.

Step 301: A second network device sends a first signal and at least one second signal to an optical transport network, where the first signal carries flexible Ethernet data.

The second network device includes a third clock module and a fourth clock module. Refer to FIG. 2. The third clock module is configured to generate a third physical layer clock. The third physical layer clock is a sending clock of a third OTU interface of the second network device. The fourth clock module is configured to generate a fourth physical layer clock. The fourth physical layer clock is a sending clock of a third OSC interface of the second network device.

The third clock module and the fourth clock module may be two different modules. Alternatively, the third clock module and the fourth clock module may be one module, so that the third physical layer clock and the fourth physical layer clock are a same clock.

For the first signal, with reference to FIG. 1, the second network device receives, through the third flexible Ethernet interface 21, a third signal sent by a fourth device. The third signal carries a flexible Ethernet frame, and the flexible Ethernet frame includes the flexible Ethernet data. One third OTU interface 22 is selected. The first signal is sent to the optical transport network through the selected third OTU interface based on the third physical layer clock generated by the third clock module or the fourth physical layer clock generated by the fourth clock module. The first signal carries the flexible Ethernet frame, to carry the flexible Ethernet data.

In some embodiments, a bandwidth of the selected third OTU interface 22 is greater than or equal to a bandwidth of the third flexible Ethernet interface 21. In other words, when receiving the third signal through the third flexible Ethernet interface 21, the second network device selects one third OTU interface 22 whose bandwidth is greater than or equal to the bandwidth of the third flexible Ethernet interface from the at least one third OTU interface in the second network device. Then, the first signal is sent to the optical transport network based on the third physical layer clock or the fourth physical layer clock through the selected third OTU interface 22.

Figure 4:
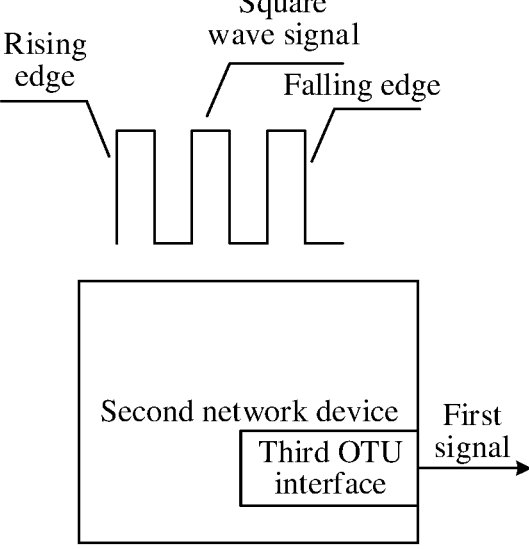
FIG. 4 is a schematic diagram of sending a signal based on a square wave signal according to an embodiment of this application.

In some embodiments, with reference to FIG. 4, the third physical layer clock is a square wave signal, and the second network device sends the first signal through the selected third OTU interface on a rising edge or a falling edge of the third physical layer clock. In this embodiment of this application, other content that relates to a concept of a physical layer clock is the same as a concept of the third physical layer clock, and details are not described one by one herein again.

Figure 5:
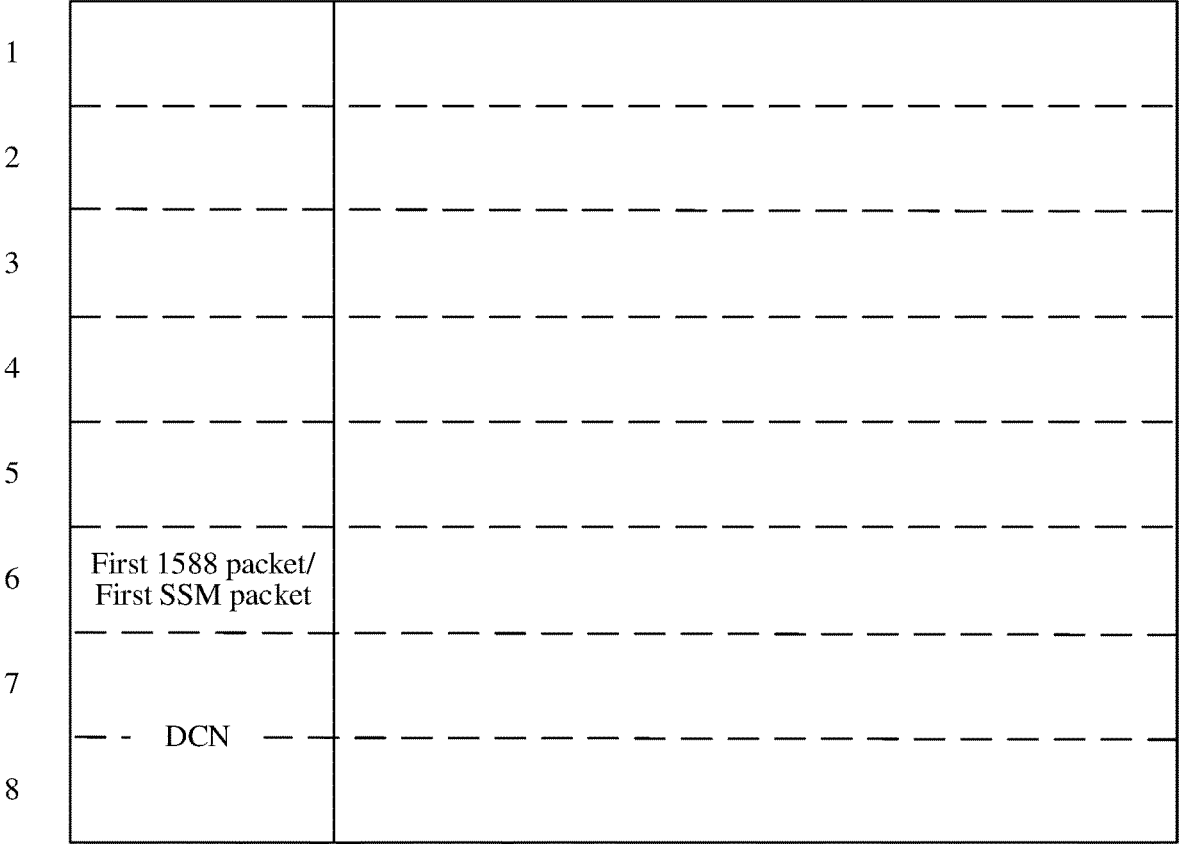
FIG. 5 is a schematic diagram of a structure of a flexible Ethernet frame according to an embodiment of this application.

Refer to FIG. 5. A flexible Ethernet frame includes a first overhead (OH) and a payload. The first OH includes such as a 1588 time, a physical layer clock quality level, and/or data management information, and the payload includes the flexible Ethernet data. The flexible Ethernet frame includes a plurality of rows. Each row includes an OH part and a payload part. The first OH of the flexible Ethernet frame includes the OH part in each row, and the payload of the flexible Ethernet frame includes the payload part in each row. For example, the flexible Ethernet frame may be a FlexE frame or an MTN frame. The FlexE frame or the MTN frame includes eight rows. The OH part of each row includes one code block, and the payload part of each row includes 20*1023 code blocks, and * is a multiplication operation. For any code block, the code block includes 66 bits of data. An OH part in a sixth row of the FlexE frame or the MTN frame includes a first 1588 packet and/or a first SSM packet. The first 1588 packet includes a first 1588 time, and the first 1588 time is a time at which the fourth device sends the first 1588 packet. The first SSM packet includes a physical layer clock quality level corresponding to the third signal. OH parts in a seventh row and an eighth row of the FlexE frame or the MTN frame include a data communication network (DCN) packet, and the DCN packet includes the data management information.

The fourth device includes a fifth clock module. The fifth clock module is configured to generate a fifth physical layer clock. The fourth device sends the third signal to the second network device based on the fifth physical layer clock. The physical layer clock quality level corresponding to the third signal is a physical layer clock quality level corresponding to the fifth physical layer clock.

In some embodiments, the second network device further includes the fourth clock module. When the second network device receives the third signal, the third signal carries the flexible Ethernet frame. The first OH of the flexible Ethernet frame includes the first 1588 packet, and the first 1588 packet includes the first 1588 time. The second network device performs time synchronization based on the first 1588 time. The second network device synchronizes the fourth clock module based on the third signal, and the synchronized fourth clock module is configured to generate the fourth physical layer clock.

Figure 6:
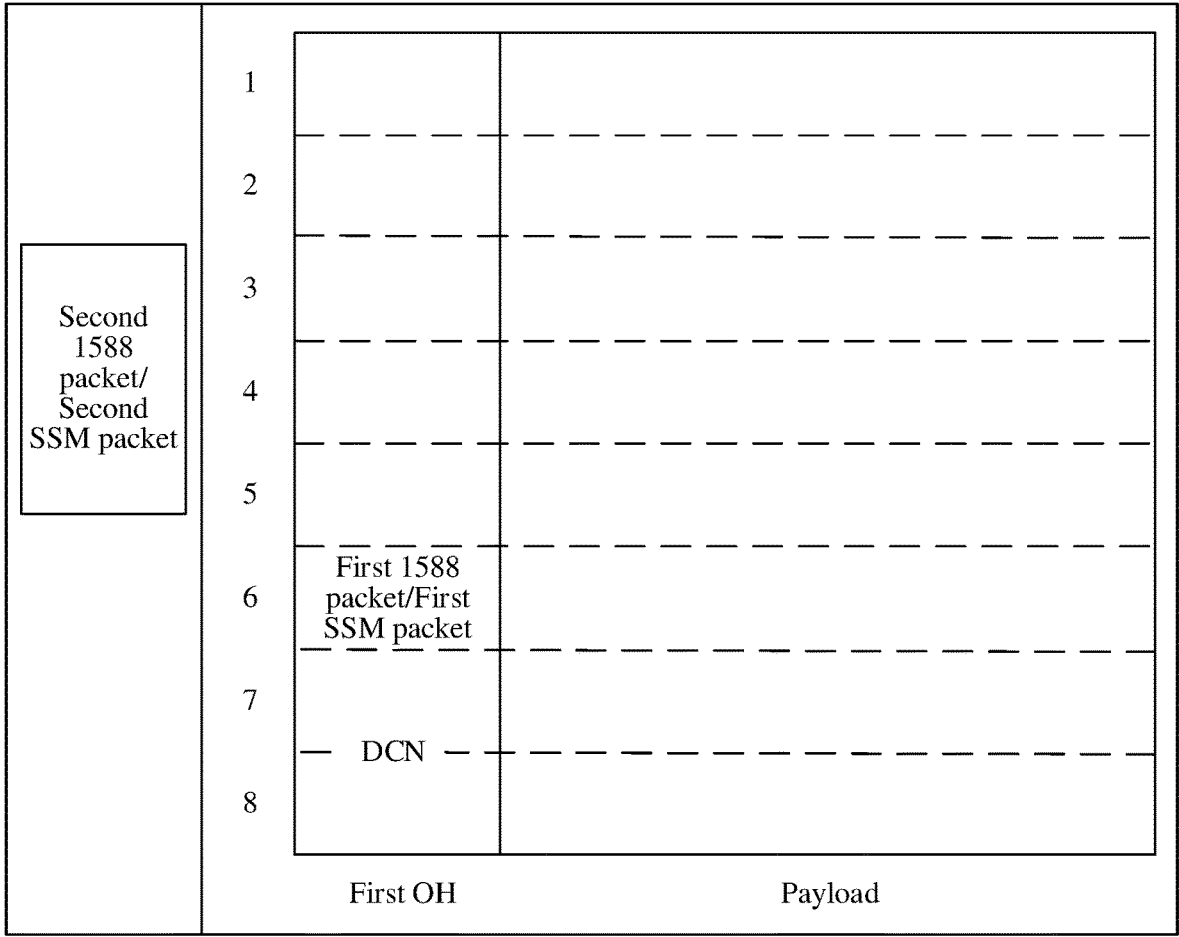
FIG. 6 is a schematic diagram of a structure of an OTU frame according to an embodiment of this application.

Then, with reference to FIG. 6, the second network device generates a second OH, and writes the second OH and the flexible Ethernet frame into an OTU frame. The second OH includes a second 1588 packet and/or a second SSM packet, and the second 1588 packet includes a second 1588 time. The second 1588 time is a 1588 time generated when the second network device after time synchronization sends the second 1588 packet, and the second SSM packet includes a physical layer clock quality level of the fourth physical layer clock generated by the fourth clock module.

In some embodiments, in addition to the flexible Ethernet frame, a payload of the OTU frame further includes other data. For example, the other data includes Ethernet data.

In some embodiments, an operation of synchronizing the fourth clock module based on the third signal is: recovering the fifth physical layer clock based on the third signal, and synchronizing the fourth clock module based on the fifth physical layer clock by the second network device.

In some embodiments, the second network device synchronizes a frequency of the fourth clock module based on a frequency of the fifth physical layer clock.

For the at least one second signal, the at least one second signal includes a second signal sent by the second network device to the optical transport network through the selected third OTU interface, and a second signal sent to the optical transport network through the third OSC interface.

For the second signal sent by the second network device through the selected third OTU interface, the second signal carries the second OH of the OTU frame. The second network device sends the second signal to the optical transport network through the third OTU interface. The second OH carried by the second signal is essentially overhead data of the OTU frame carried by the second signal.

In some embodiments, the physical layer clock quality level corresponding to the second signal is equal to the physical layer clock quality level in the second SSM packet in the second OH.

For the second signal sent by the second network device through the third OSC interface, the second signal carries a third 1588 packet and/or a third SSM packet.

In some embodiments, a process in which the second network device sends the second signal through the third OSC interface is as follows:

The second network device sends the second signal based on the fourth physical layer clock through the third OSC interface. The second signal carries the third 1588 packet and/or the third SSM packet. The third 1588 packet includes a third 1588 time, and the third 1588 time is a 1588 time generated when the second network device after time synchronization sends the third 1588 packet. A physical layer clock quality level in the third SSM packet is equal to the physical layer clock quality level corresponding to the second signal. In other words, the physical layer clock quality level corresponding to the second signal is the physical layer clock quality level of the fourth physical layer clock.

In some embodiments, the second network device includes a second non-flexible Ethernet interface. The second network device receives, through the second non-flexible Ethernet interface, the non-flexible Ethernet data sent by the fifth device, and sends the non-flexible Ethernet data to the optical transport network through the selected third OTU interface or another OTU interface.

For example, with reference to FIG. 2, the second network device receives, through the third FlexE interface 21, a third signal sent by the second SPN. The third signal carries the flexible Ethernet frame shown in FIG. 5. The second network device obtains the first 1588 time from the first 1588 packet that is included in the first OH in the flexible Ethernet frame, performs time synchronization based on the first 1588 time, recovers the fifth physical layer clock based on the third signal, and synchronizes the fourth clock module based on the fifth physical layer clock. The synchronized fourth clock module generates the fourth physical layer clock. The second network device generates the second OH. The second OH includes the second 1588 packet and the second SSM packet, and the second 1588 packet includes a second 1588 time. The second 1588 time is the 1588 time generated when the second network device after synchronization sends the second 1588 packet, and the second SSM packet includes the physical layer clock quality level of the fourth physical layer clock. The second network device uses the second OH and the flexible Ethernet frame shown in FIG. 5 and/or other non-flexible Ethernet data to form the OTU frame shown in FIG. 6.

The second network device sends the first signal and a second signal 1 through the selected third OTU interface based on the third physical layer clock generated by the third clock module. The first signal carries the flexible Ethernet frame shown in FIG. 5. As shown in FIG. 6, the first signal carries the flexible Ethernet frame included in the payload of the OTU frame, and the second signal 1 carries the second OH.

In some embodiments, the second network device may alternatively send the first signal and the second signal 1 based on the fourth physical layer clock through the selected third OTU interface. The first signal carries the flexible Ethernet frame shown in FIG. 5. As shown in FIG. 6, the payload of the OTU frame carries the first signal, and the second OH is configured to carry the second signal 1.

The second network device sends a second signal 2 based on the fourth physical layer clock through the third OSC interface. The second signal 2 carries the third 1588 packet and the third SSM packet. The third 1588 packet includes the 1588 time when the second network device after synchronization sends the third 1588 packet. The third SSM packet includes the physical layer clock quality level corresponding to the fourth physical layer clock.

The third clock module and the fourth clock module may be a same module, so that the third physical layer clock and the fourth physical layer clock may be a same clock.

For another example, with reference to FIG. 2, the second network device further receives, through the third GE interface, the non-flexible Ethernet data sent by the third router, and sends the non-flexible Ethernet data through the selected third OTU interface.

After the second network device sends the first signal, the second signal 1, and the second signal 2 to the optical transport network, the first signal, the second signal 1, and the second signal 2 are transmitted to a first network device through the optical transport network.

In the optical transport network, the first signal is forwarded by at least one optical transport network device. After receiving the first signal, each optical transport network device transparently transmits the first signal to a next optical transport network device.

The second signal 1 and/or the second signal 2 are also forwarded by at least one optical transport network device. Each optical transport network device includes a clock module. When each optical transport network device receives the second signal 1 and/or the second signal 2, the optical transport network device synchronizes, based on the second signal 1 and/or the second signal 2, the clock module included in the optical transport network device, and transmits a new second signal 1 and/or a new second signal 2 to a next device based on a physical layer clock generated by the synchronized clock module.

Because each optical transport network device through which the first signal passes transparently transmits the first signal, each optical transport network device through which the second signal 1 and the second signal 2 pass synchronizes the clock module included in the optical transport network device, and transmits the new second signal 1 and the new second signal 2 based on the physical layer clock generated by the synchronized clock module. In this way, when the first network device receives the first signal, the second signal 1, and the second signal 2, physical layer clock performance corresponding to the second signal 1 and the second signal 2 received by the first network device is higher than physical layer clock performance corresponding to the first signal.

Refer to FIG. 1. The first network device further includes at least one Ethernet interface. For any Ethernet interface in the at least one Ethernet interface, the first network device communicates with the third device through the Ethernet interface. The third device may also send the second signal to the first network device. The second signal carries the non-flexible Ethernet data, and the non-flexible Ethernet data includes the physical layer clock quality level corresponding to the second signal.

For example, with reference to FIG. 2, the second router sends a second signal 3 to the first network device, and the second signal 3 includes the non-flexible Ethernet data that the second router needs to send.

Step 302: The first network device receives the first signal and the at least one second signal, where the first signal carries the flexible Ethernet data.

The first network device receives the first signal from the optical transport network through a first OTU interface. The first signal carries the flexible Ethernet data.

In some embodiments, the first network device receives the at least one second signal in the following manners. The manners are as follows:

Manner 1: The first network device includes the first OTU interface, and the first network device receives the second signal through the first OTU interface. The second signal carries the second OH of the OTU frame, and the second OH includes the second 1588 packet and/or the second SSM packet.

Manner 2: The first network device includes a first OSC interface, and the first network device receives the second signal through the first OSC interface. The second signal carries the third 1588 packet and/or the third SSM packet.

Manner 3: The first network device includes at least one Ethernet interface. For any Ethernet interface of the at least one Ethernet interface, the first network device receives the second signal through the Ethernet interface. The second signal carries the non-flexible Ethernet data, and/or the second signal carries the physical layer clock quality level corresponding to the second signal.

Figure 7:
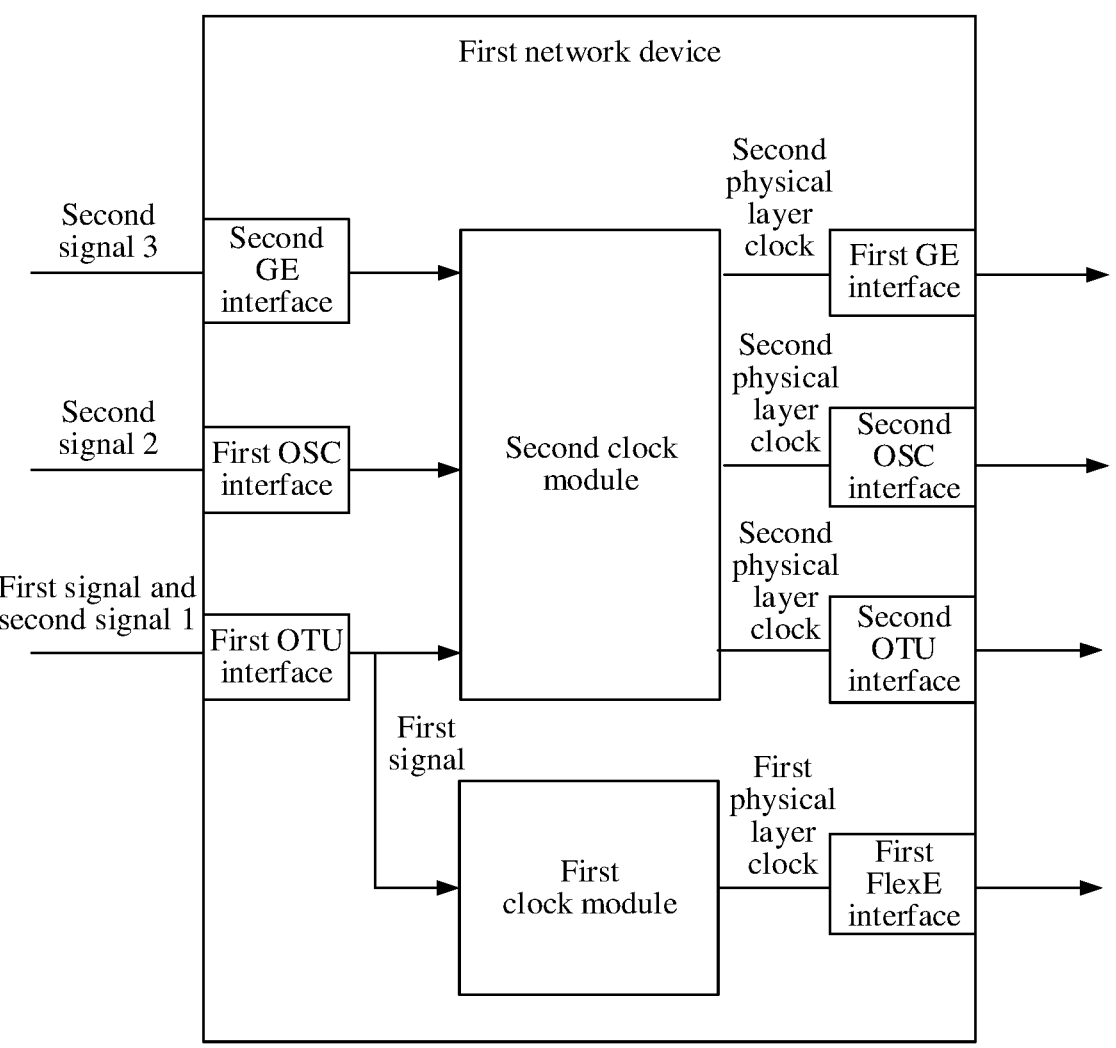
FIG. 7 is a schematic diagram of determining a physical layer clock by a first network device according to an embodiment of this application.

For example, with reference to FIG. 2 or FIG. 7, it is assumed that the at least one Ethernet interface in the first network device includes a second GE interface. In this way, the first network device receives the first signal through the first OTU interface, and receives the foregoing second signal 1. The second network device receives the second signal 2 through the first OSC, and receives the second signal 3 through the second GE interface. In other words, the second network device receives one first signal and three second signals.

In some embodiments, the first network device further receives the non-flexible Ethernet data from the optical transport network through the first OTU interface. The non-flexible Ethernet data is the non-flexible Ethernet data sent by the second network device through the selected third OTU interface.

Step 303: The first network device determines a first physical layer clock based on the first signal.

The first network device includes a first clock module and a second clock module.

In step 303, the first network device synchronizes the first clock module of the first network device based on the first signal. The synchronized first clock module is configured to generate the first physical layer clock. The first physical layer clock is a physical layer clock signal.

In some embodiments, an operation of synchronizing the first clock module of the first network device based on the first signal is: synchronizing a frequency of the first clock module of the first network device based on a frequency of a physical layer clock corresponding to the first signal.

In some embodiments, a physical layer clock quality level corresponding to a first physical layer clock signal is equal to a physical layer clock quality level corresponding to the first signal. The first network device extracts the physical layer clock quality level corresponding to the first signal from the first signal.

In some embodiments, a physical layer clock priority corresponding to the first physical layer clock signal may be manually set.

For each second signal, physical layer clock quality level corresponding to each second signal is extracted from each second signal. For an interface receiving any second signal, the first network device stores a physical layer clock priority corresponding to the interface. When receiving the second signal based on the interface, the first network device uses the physical layer clock priority corresponding to the interface as a physical layer clock priority corresponding to the second signal.

Step 304: The first network device determines a second physical layer clock based on the at least one second signal or the first physical layer clock and the at least one second signal.

In step 304, the first network device may determine the second physical layer clock in the following manners. The manners are as follows:

In a first manner, the first network device determines the second physical layer clock based on the physical layer clock quality level corresponding to each second signal in the at least one second signal, and/or determines the second physical layer clock based on the physical layer clock priority corresponding to each second signal in the at least one second signal.

A higher physical layer clock quality level corresponding to the second signal, and/or a higher physical layer clock priority corresponding to the second signal indicates higher precision of the second physical layer clock determined based on the second signal.

In the first manner, the first network device selects one second signal based on the physical layer clock quality level and/or the physical layer clock priority corresponding to each of the at least one second signal through a clock source selection algorithm. A physical layer clock for sending the second signal is recovered based on the selected second signal. The second clock module is synchronized based on the physical layer clock. A physical layer clock generated by the synchronized second clock module is used as the second physical layer clock.

In some embodiments, an operation of synchronizing the second clock module based on the physical layer clock is: synchronizing a frequency of the second clock module based on a frequency of the physical layer clock.

A physical layer clock quality level corresponding to the second physical layer clock is equal to a physical layer clock quality level corresponding to the selected second signal.

In some embodiments, the first network device selects a second signal whose physical layer clock quality level is the highest or whose physical layer clock priority is the highest, or selects a second signal whose physical layer clock quality level exceeds a specified level threshold, or selects a second signal whose physical layer clock priority exceeds a specified priority threshold to synchronize the second clock module.

For example, with reference to FIG. 7, three second signals received by the first network device are respectively the second signal 1 received by the first network device through the first OTU interface, the second signal 2 received by the first network device through the first OSC, and the second signal 3 received through the second GE interface.

The first network device selects one second signal with a highest physical layer clock quality level or a highest physical layer clock priority based on a physical layer clock quality level or a physical layer clock priority corresponding to each of the three second signal through a clock source selection algorithm (for example, a clock source selection algorithm of ITU-T G.781). It is assumed that the second signal 2 is selected, and a physical layer clock for sending the second signal 2 is recovered based on the second signal 2. The physical layer clock is the fourth physical layer clock. The second clock module is synchronized based on the fourth physical layer clock. A physical layer clock generated by the synchronized second clock module is used as the second physical layer clock.

In a second manner, the first network device determines the second physical layer clock based on a physical layer clock quality level corresponding to the first physical layer clock and a physical layer clock quality level corresponding to the at least one second signal, and/or determines the second physical layer clock based on a physical layer clock priority corresponding to the first physical layer clock and a physical layer clock priority corresponding to the at least one second signal.

In the second manner, the first network device determines the second physical layer clock based on the physical layer clock quality level corresponding to the first physical layer clock and the physical layer clock quality level corresponding to the at least one second signal, and/or determines the second physical layer clock based on the physical layer clock priority corresponding to the first physical layer clock and the physical layer clock priority corresponding to the at least one second signal. The implementation is as following.

Figure 8:
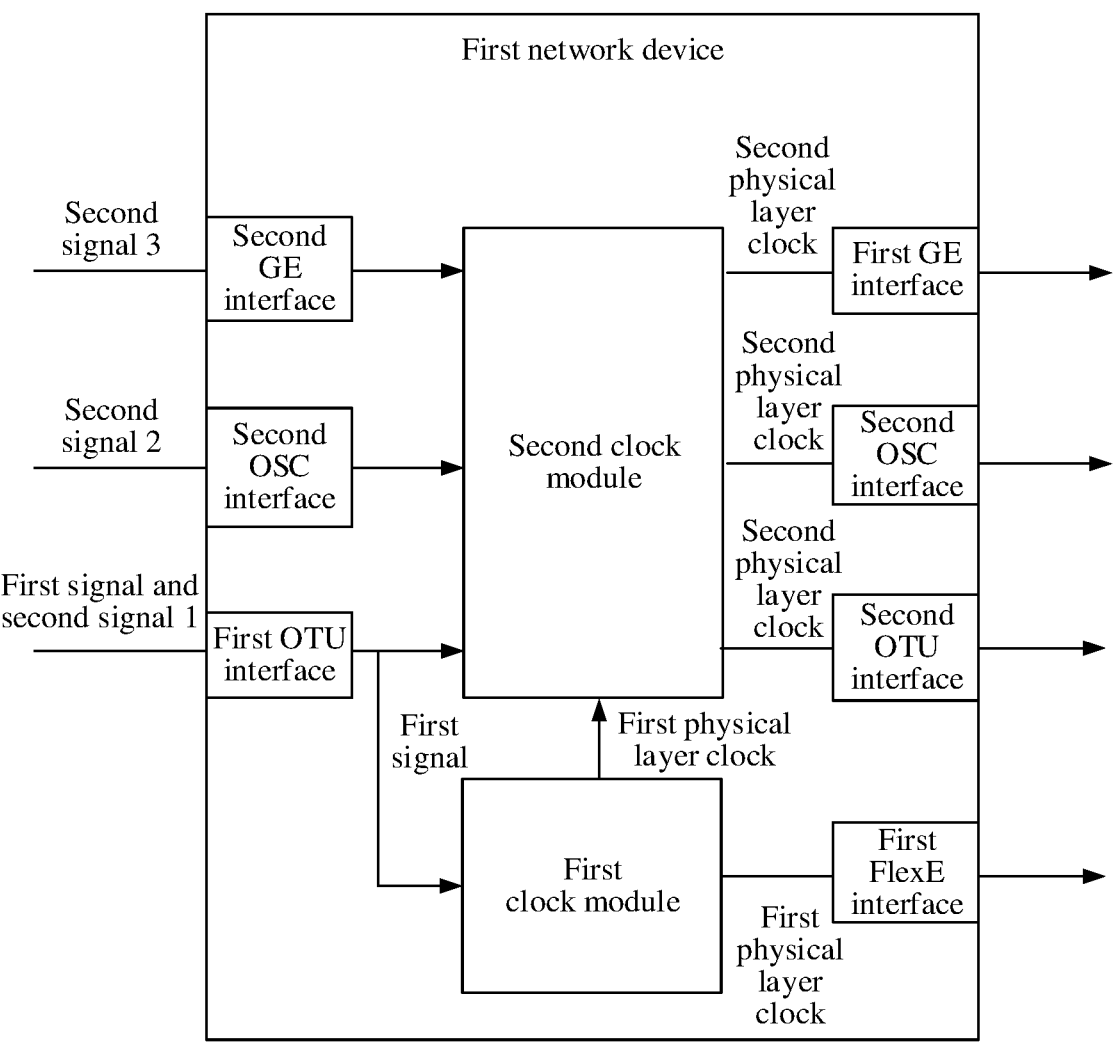
FIG. 8 is another schematic diagram of determining a physical layer clock by a first network device according to an embodiment of this application.

Refer to FIG. 8. The first network device obtains the first physical layer clock output by the synchronized first clock module. The physical layer clock quality level corresponding to the first physical layer clock is equal to the physical layer clock quality level corresponding to the first signal, and the physical layer clock priority corresponding to the first physical layer clock is manually set. Then, the first network device selects one signal based on the physical layer clock quality level corresponding to each second signal in the at least one second signal and the physical layer clock quality level corresponding to the first physical layer clock through the clock source selection algorithm (for example, the clock source selection algorithm of ITU-T G.781), and/or the first network device selects one signal based on the physical layer clock priority corresponding to each second signal in the at least one second signal and the physical layer clock priority corresponding to the first physical layer clock through the clock source selection algorithm (for example, the clock source selection algorithm of ITU-T G.781). The selected signal may be a first physical layer clock, or may be a physical layer clock corresponding to one second signal. The second clock module is synchronized based on the selected physical layer clock. A physical layer clock generated by the synchronized second clock module is used as the second physical layer clock.

In some embodiments, an operation of synchronizing the second clock module based on the selected physical layer clock is: synchronizing the frequency of the second clock module based on a frequency of the selected physical layer clock.

Step 305: The first network device uses the first physical layer clock or the second physical layer clock as a sending clock of a first non-flexible Ethernet interface. The first non-flexible Ethernet interface is any first non-flexible Ethernet interface in the first network device.

In step 305, the first network device further uses the first physical layer clock as a sending clock of a first flexible Ethernet interface.

The using the first physical layer clock as the sending clock of the first flexible Ethernet interface means that when sending the flexible Ethernet data, the first network device sends the flexible Ethernet data through the first flexible Ethernet interface based on the first physical layer clock generated by the first clock module.

The first network device may use the first physical layer clock or the second physical layer clock as the sending clock of the first non-flexible Ethernet interface in the following manners.

In a first manner, the first network device uses the first physical layer clock or the second physical layer clock as the sending clock of the first non-flexible Ethernet interface according to a configuration command.

A management device may send the configuration command to the first network device, and the configuration command includes indication information. The indication information is used for indicating to use the first physical layer clock as the sending clock of the first non-flexible Ethernet interface, or used for indicating to use the second physical layer clock as the sending clock of the first non-flexible Ethernet interface.

The first network device receives the configuration command. When the indication information in the configuration command is used for indicating to use the first physical layer clock as the sending clock of the first non-flexible Ethernet interface, the first network device uses the first physical layer clock as the sending clock of the first non-flexible Ethernet interface. Alternatively, when the indication information in the configuration command is used for indicating to use the second physical layer clock as the sending clock of the first non-flexible Ethernet interface, the first network device uses the second physical layer clock as the sending clock of the first non-flexible Ethernet interface.

In a second manner, the first network device uses the first physical layer clock or the second physical layer clock as the sending clock of the first non-flexible Ethernet interface based on the physical layer clock quality level of the first physical layer clock and the physical layer clock quality level of the second physical layer clock.

The second network device selects a physical layer clock with a highest physical layer clock quality level based on the physical layer clock quality level of the first physical layer clock and the physical layer clock quality level of the second physical layer clock, and uses the selected physical layer clock as the sending clock of the first non-flexible Ethernet interface.

In a third manner, the first network device uses the first physical layer clock or the second physical layer clock as the sending clock of the first non-flexible Ethernet interface based on the physical layer clock priority of the first physical layer clock and the physical layer clock priority of the second physical layer clock. The physical layer clock priority of the first physical layer clock may be manually configured.

The first network device selects a physical layer clock with a highest physical layer clock priority based on the physical layer clock priority of the first physical layer clock and the physical layer clock priority of the second physical layer clock, and uses the selected physical layer clock as the sending clock of the first non-flexible Ethernet interface.

Figure 9:
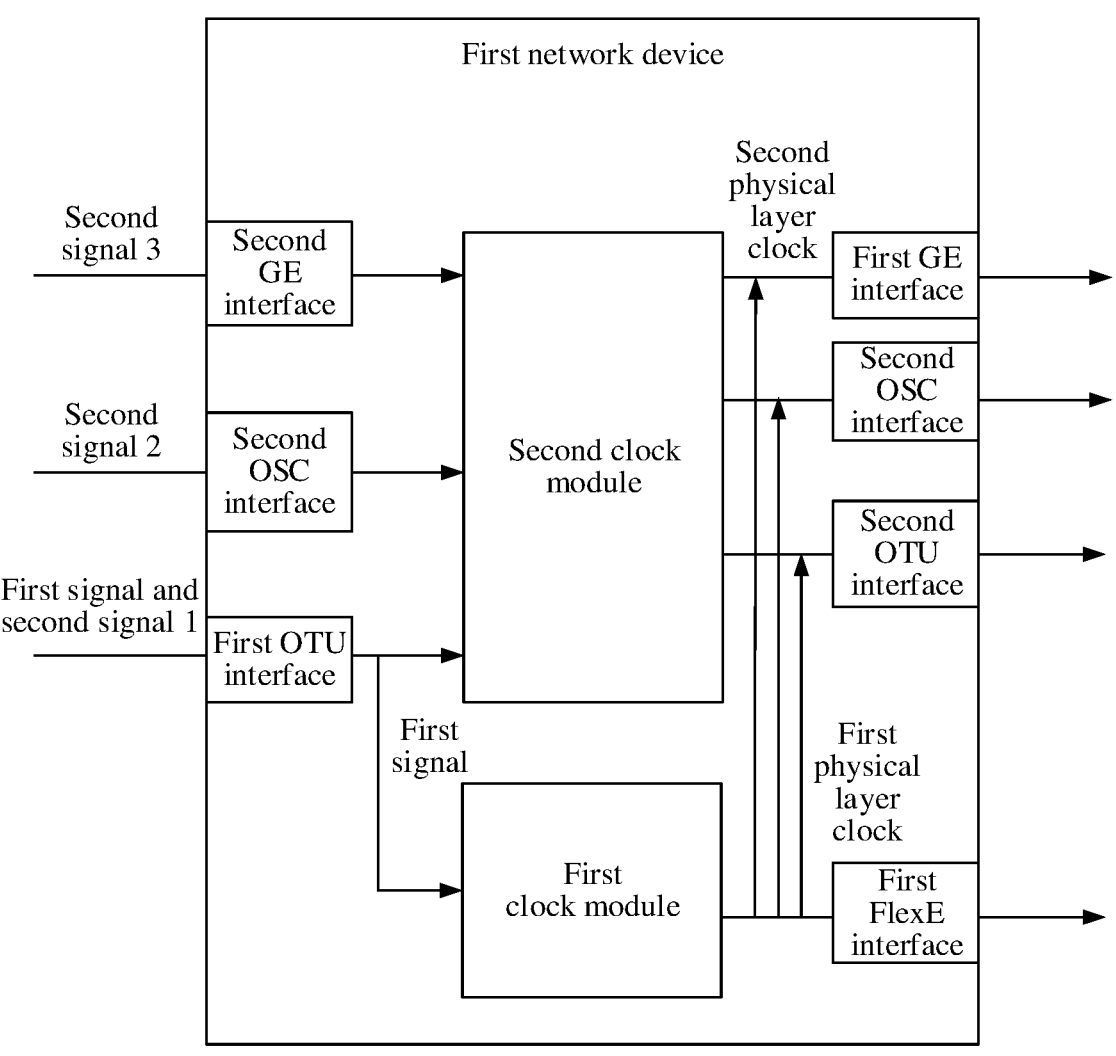
FIG. 9 is another schematic diagram of determining a physical layer clock by a first network device according to an embodiment of this application.

Refer to FIG. 9. When the first network device uses the first physical layer clock as the sending clock of the first non-flexible Ethernet interface, the first clock module is electrically connected to the first non-flexible Ethernet interface in the first network device. In this way, when sending the non-flexible Ethernet data, the first network device sends the non-flexible Ethernet data through the first non-flexible Ethernet interface based on the first physical layer clock generated by the first clock module.

Alternatively, when the first network device uses the second physical layer clock as the sending clock of the first non-flexible Ethernet interface, the second clock module is electrically connected to the first non-flexible Ethernet interface in the first network device. In this way, when sending the non-flexible Ethernet data, the first network device sends the non-flexible Ethernet data through the first non-flexible Ethernet interface based on the second physical layer clock generated by the second clock module.

For any second signal received by the first network device through the Ethernet interface, the second signal corresponds to one first non-flexible Ethernet interface in the second network device, and the second signal carries the non-flexible Ethernet data. After selecting one physical layer clock from the first physical layer clock and the second physical layer clock, the first network device sends the non-flexible Ethernet data based on the selected physical layer clock through any first non-flexible Ethernet interface, or sends the non-flexible Ethernet data through the first non-flexible Ethernet interface corresponding to the second signal.

For the non-flexible Ethernet data received by the first network device through the first OTU interface, the non-flexible Ethernet data corresponds to one first non-flexible Ethernet interface in the second network device. After selecting one physical layer clock from the first physical layer clock and the second physical layer clock, the first network device sends the non-flexible Ethernet data based on the selected physical layer clock through any first non-flexible Ethernet interface, or sends the non-flexible Ethernet data through the first non-flexible Ethernet interface corresponding to the non-flexible Ethernet data.

For the payload of the OTU frame received through the first OTU interface, for network data that is other than the flexible Ethernet frame and that is included in the payload, the other data corresponds to one first non-flexible Ethernet interface in the second network device. After selecting one physical layer clock from the first physical layer clock and the second physical layer clock, the first network device sends the other data based on the selected physical layer clock through any first non-flexible Ethernet interface, or sends the other data through the first non-flexible Ethernet interface corresponding to the other data.

For example, with reference to FIG. 2, the first network device receives the non-flexible Ethernet data through the first OTU interface 13, and the first non-flexible Ethernet interface corresponding to the non-flexible Ethernet data is the first GE interface. It is assumed that the first network device selects the second physical layer clock as the sending clock of the first GE interface. In this way, the first network device sends the non-flexible Ethernet data based on the second physical layer clock through the first GE interface, and/or the first network device receives the OTU frame through the first OTU interface 13. For the Ethernet data included in the payload of the OTU frame, the first non-flexible Ethernet interface corresponding to the Ethernet data is also the first GE interface. It is assumed that the first network device selects the second physical layer clock as the sending clock of the first GE interface. In this way, the first network device sends the Ethernet data based on the second physical layer clock through the first GE interface.

In this embodiment of this application, the first network device receives the first signal and the at least one second signal, determines the first physical layer clock based on the first signal, and determines the second physical layer clock based on the at least one second signal, or determines the second physical layer clock based on the first physical layer clock and the at least one second signal. The first physical layer clock is used as the sending clock of the first flexible Ethernet interface, and the first physical layer clock or the second physical layer clock is used as a sending clock of at least one first non-flexible Ethernet interface. Therefore, the sending clock of the at least one first non-flexible Ethernet interface is obtained based on a signal (the first signal or the second signal) received by the first network device. In this way, a clock of an upstream device (which may be the second network device or another device) that sends the signal may be continuously transmitted through the at least one first non-flexible Ethernet interface. In addition, in conventional technologies, a clock generated by a local crystal oscillator is used, and non-flexible Ethernet data is sent through a non-flexible Ethernet interface. However, in this embodiment of this application, because the sending clock of the first non-flexible Ethernet interface is obtained based on the signal (the first signal or the second signal) received by the first network device, a clock generated based on the received signal is used as the sending clock of the non-flexible Ethernet interface. Therefore, the edge device may transmit the clock of the upstream device through the non-flexible Ethernet interface of the edge device, and improve precision of the sending clock of the non-flexible Ethernet interface of the edge device. In addition, in some embodiments, in a case in which the second physical layer clock is determined based on the second signal received by the first OSC interface of the first network device, because the physical layer clock quality level corresponding to the second signal received by the first OSC interface is higher, the edge device may transmit a higher level clock based on the second physical layer clock through the first non-flexible Ethernet interface.

Figure 10:
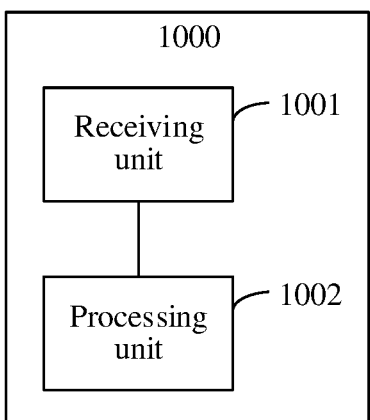
FIG. 10 is a schematic diagram of a structure of an apparatus for determining a clock according to an embodiment of this application.

Refer to FIG. 10. An embodiment of this application provides an apparatus 1000 for determining a clock. The apparatus 1000 is deployed on the first network device provided in any one of the foregoing embodiments. For example, the apparatus 1000 is deployed on the first network device in the network architecture 100 shown in FIG. 1 or FIG. 2, is deployed on the first network device in the method 300 shown in FIG. 3, or is deployed on the first network device shown in FIG. 7, FIG. 8, or FIG. 9. The apparatus 1000 includes:

a receiving unit 1001, configured to receive a first signal and at least one second signal, where the first signal carries data to be sent through a first flexible Ethernet interface;

a processing unit 1002, configured to determine a first physical layer clock based on the first signal, where the processing unit 1002 is further configured to determine a second physical layer clock based on the at least one second signal or the first physical layer clock and the at least one second signal;

the processing unit 1002 is further configured to use the first physical layer clock or the second physical layer clock as a sending clock of a non-flexible Ethernet interface; and the apparatus 1000 includes the first flexible Ethernet interface and the non-flexible Ethernet interface.

Optionally, for a detailed implementation process in which the receiving unit 1001 receives the first signal and the at least one second signal, refer to content in step 302 of the method 300 shown in FIG. 3. Details are not described here again.

Optionally, for a detailed implementation process in which the processing unit 1002 determines the first physical layer clock, refer to content in step 303 of the method 300 shown in FIG. 3. Details are not described here again.

Optionally, for a detailed implementation process in which the processing unit 1002 determines the second physical layer clock, refer to content in step 304 of the method 300 shown in FIG. 3. Details are not described here again.

Optionally, for a detailed implementation process in which the processing unit 1002 uses the first physical layer clock or the second physical layer clock as the sending clock of the non-flexible Ethernet interface, refer to content in step 305 of the method 300 shown in FIG. 3. Details are not described here again.

Optionally, the processing unit 1002 is configured to:

determine the second physical layer clock based on a physical layer clock quality level corresponding to the at least one second signal; and/or determine the second physical layer clock based on a physical layer clock priority corresponding to the at least one second signal.

Optionally, for a detailed implementation process in which the processing unit 1002 determines the second physical layer clock based on the physical layer clock quality level or the physical layer clock priority corresponding to the at least one second signal, refer to content in step 304 of the method 300 shown in FIG. 3. Details are not described here again.

Optionally, the processing unit 1002 is configured to:

determine the second physical layer clock based on a physical layer clock quality level corresponding to the first physical layer clock and a physical layer clock quality level corresponding to the at least one second signal; and/or determine the second physical layer clock based on a physical layer clock priority corresponding to the first physical layer clock and a physical layer clock priority corresponding to the at least one second signal.

Optionally, for a detailed implementation process in which the processing unit 1002 determines the second physical layer clock, refer to content in step 304 of the method 300 shown in FIG. 3. Details are not described here again.

Optionally, the processing unit 1002 is configured to use the first physical layer clock or the second physical layer clock as the sending clock of the non-flexible Ethernet interface according to a configuration command.

Optionally, for a detailed implementation process in which the processing unit 1002 uses the first physical layer clock or the second physical layer clock as the sending clock of the non-flexible Ethernet interface, refer to content in step 305 of the method 300 shown in FIG. 3. Details are not described here again.

Optionally, the processing unit 1002 is configured to:

use the first physical layer clock or the second physical layer clock as the sending clock of the non-flexible Ethernet interface based on the physical layer clock quality level of the first physical layer clock and a physical layer clock quality level of the second physical layer clock; and/or use the first physical layer clock or the second physical layer clock as the sending clock of the non-flexible Ethernet interface based on the physical layer clock priority of the first physical layer clock and a physical layer clock priority of the second physical layer clock.

Optionally, for a detailed implementation process in which the processing unit 1002 uses the first physical layer clock or the second physical layer clock as the sending clock of the non-flexible Ethernet interface, refer to content in step 305 of the method 300 shown in FIG. 3. Details are not described here again.

Optionally, the processing unit 1002 is further configured to use the first physical layer clock as a sending clock of the first flexible Ethernet interface.

Optionally, for a detailed implementation process in which the processing unit 1002 uses the first physical layer clock as the sending clock of the first flexible Ethernet interface, refer to content in step 305 of the method 300 shown in FIG. 3. Details are not described here again.

Optionally, the apparatus 1000 is an edge device of an optical transport network, and the first signal comes from the optical transport network.

Optionally, a type of the first flexible Ethernet interface includes a flexible Ethernet FlexE, a slicing packet network SPN, or a metro transport network MTN.

Optionally, a type of the non-flexible Ethernet interface includes an Ethernet interface, a synchronous digital hierarchy SDH, a synchronous optical network SONET, an optical supervisory channel OSC, or an optical transport unit OTU.

Optionally, the first signal carries flexible Ethernet data received through a first OTU interface of the apparatus 1000.

Optionally, any one of the at least one second signal carries overhead data received through the first OTU interface of the apparatus 1000.

Alternatively, any one of the at least one second signal carries data received through an OSC interface of the apparatus 1000.

Alternatively, any one of the at least one second signal carries data received through an Ethernet interface of the apparatus 1000.

In this embodiment of this application, the receiving unit receives the first signal and the at least one second signal. The first signal carries the data to be sent through the first flexible Ethernet interface. The processing unit determines the first physical layer clock based on the first signal, and determines the second physical layer clock based on the at least one second signal or the first physical layer clock and the at least one second signal. The processing unit uses the first physical layer clock as the sending clock of the first flexible Ethernet interface, and uses the first physical layer clock or the second physical layer clock as the sending clock of the non-flexible Ethernet interface. Because both the first signal and the at least one second signal are signals received by the receiving unit, the processing unit uses the first physical layer clock or the second physical layer clock as the sending clock of the non-flexible Ethernet interface. Therefore, the sending clock of the non-flexible Ethernet interface is obtained based on the signal (the first signal or the second signal) received by the receiving unit. In this way, the clock of the upstream device that sends the signal can continue to be transmitted through the non-flexible Ethernet interface. In addition, in conventional technologies, a clock generated by a local crystal oscillator is used, and non-flexible Ethernet data is sent through a non-flexible Ethernet interface. However, because the sending clock of the non-flexible Ethernet interface is obtained based on the received signal (the first signal or the second signal), a clock generated based on the received signal is used as the sending clock of the non-flexible Ethernet interface. Therefore, the edge device may transmit the clock of the upstream device through the non-flexible Ethernet interface of the edge device, and improve precision of the sending clock of the non-flexible Ethernet interface of the edge device.

Figure 11:
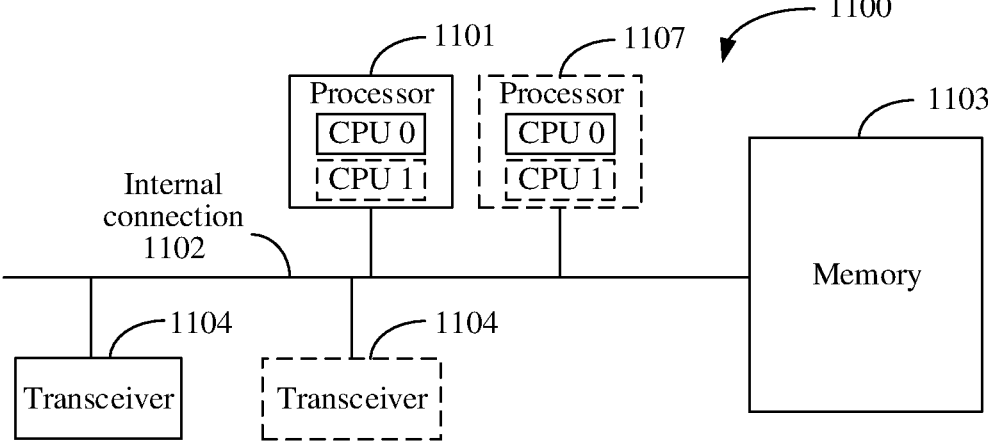
FIG. 11 is a schematic diagram of a structure of another apparatus for determining a clock according to an embodiment of this application.

Refer to FIG. 11. An embodiment of this application provides a schematic diagram of an apparatus 1100 for determining a clock. The apparatus 1100 may be the first network device in any one of the foregoing embodiments. For example, the apparatus 1100 is the first network device in the network architecture 100 shown in FIG. 1 or FIG. 2, the first network device in the method 300 shown in FIG. 3, or the first network device shown in FIG. 7, FIG. 8, or FIG. 9. The apparatus 1100 includes at least one processor 1101, an internal connection 1102, a memory 1103, and at least one transceiver 1104.

The apparatus 1100 is an apparatus with a hardware structure, and may be configured to implement functional modules in the apparatus 1000 in FIG. 10. For example, a person skilled in the art may figure out that the processing unit 1002 in the apparatus 1000 shown in FIG. 10 may be implemented by invoking code in the memory 1103 by the at least one processor 1101, and the receiving unit 1001 in the apparatus 1000 shown in FIG. 10 may be implemented by the transceiver 1104.

Optionally, the apparatus 1100 may be further configured to implement functions of the first network device in any one of the foregoing embodiments.

Optionally, the processor 1101 may be a general-purpose central processing unit (CPU), a network processor (NP), a microprocessor, or an application-specific integrated circuit (ASIC), or one or more integrated circuits configured to control program execution of solutions of this application.

The internal connection 1102 may include a path for transmitting information between the foregoing components. Optionally, the internal connection 1102 is a board, a bus, or the like.

The foregoing transceiver 1104 is configured to communicate with another device or a communication network.

The foregoing memory 1103 may be a read-only memory (ROM) or another type of static storage device that can store static information and instructions, or a random access memory (RAM) or another type of dynamic storage device that can store information and instructions; or may be an electrically erasable programmable read-only memory (EE-PROM), a compact disc read-only memory (CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through a bus. The memory may alternatively be integrated with the processor.

The memory 1103 is configured to store application program code for executing the solutions of this application, and the processor 1101 controls the execution. The processor 1101 is configured to execute the application program code stored in the memory 1103, and cooperate with the at least one transceiver 1104, so that the apparatus 1100 implements functions in the method of this patent.

In a specific implementation, in an embodiment, the processor 1101 may include one or more CPUs, for example, a CPU 0 and a CPU 1 in FIG. 11.

In a specific implementation, in an embodiment, the apparatus 1100 may include a plurality of processors, for example, the processor 1101 and a processor 1107 in FIG. 11. Each of these processors may be a single-core (single-CPU) processor, or may be a multi-core (multi-CPU) processor. The processor herein may be one or more devices, circuits, and/or processing cores configured to process data (for example, computer program instructions).

A person of ordinary skill in the art may understand that all or some of the steps of embodiments may be implemented by hardware or a program instructing related hardware. The program may be stored in a computer-readable storage medium. The storage medium may be a read-only memory, a magnetic disk, or an optical disc, or the like.

The foregoing descriptions are merely optional embodiments of this application, but are not intended to limit this application. Any modification, equivalent replacement, or improvement made within the principle of this application should fall within the protection scope of this application.

What is claimed is:

1. A method for determining a clock, the method comprising:

receiving, by a first network device, a first signal and at least one second signal, wherein the first signal carries data to be sent through a first flexible Ethernet interface;

determining, by the first network device, a first physical layer clock based on the first signal;

determining, by the first network device, a second physical layer clock based on the at least one second signal or the first physical layer clock and the at least one second signal; and adopting, by the first network device, the first physical layer clock or the second physical layer clock as a sending clock of a non-flexible Ethernet interface, wherein the first network device comprises the first flexible Ethernet interface and the non-flexible Ethernet interface.

2. The method according to claim 1, wherein determining, by the first network device, the second physical layer clock based on the at least one second signal comprises:

determining, by the first network device, the second physical layer clock based on a physical layer clock quality level associated with the at least one second signal; and/or determining, by the first network device, the second physical layer clock based on a physical layer clock priority associated with the at least one second signal.

3. The method according to claim 1, wherein determining, by the first network device, the second physical layer clock based on the first physical layer clock and the at least one second signal comprises:

determining, by the first network device, the second physical layer clock based on a physical layer clock quality level associated with the first physical layer clock and a physical layer clock quality level associated with the at least one second signal; and/or determining, by the first network device, the second physical layer clock based on a physical layer clock priority associated with the first physical layer clock and a physical layer clock priority associated with the at least one second signal.

4. The method according to claim 1, wherein adopting, by the first network device, the first physical layer clock or the second physical layer clock as the sending clock of the non-flexible Ethernet interface comprises:

adopting, by the first network device, the first physical layer clock or the second physical layer clock as the sending clock of the non-flexible Ethernet interface according to a configuration command.

5. The method according to claim 1, wherein adopting, by the first network device, the first physical layer clock or the second physical layer clock as the sending clock of the non-flexible Ethernet interface comprises:

adopting, by the first network device, the first physical layer clock or the second physical layer clock as the sending clock of the non-flexible Ethernet interface based on a physical layer clock quality level of the first physical layer clock and a physical layer clock quality level of the second physical layer clock; and/or adopting, by the first network device, the first physical layer clock or the second physical layer clock as the sending clock of the non-flexible Ethernet interface based on a physical layer clock priority of the first physical layer clock and a physical layer clock priority of the second physical layer clock.

6. The method according to claim 1, further comprising:

adopting, by the first network device, the first physical layer clock as a sending clock of the first flexible Ethernet interface.

7. The method according to claim 1, wherein the first network device is an edge device of an optical transport network, and the first signal comes from the optical transport network.

8. The method according to claim 1, wherein a type of the first flexible Ethernet interface comprises a flexible Ethernet (FlexE), a slicing packet network (SPN), or a metro transport network (MTN).

9. The method according to claim 1, wherein a type of the non-flexible Ethernet interface comprises an Ethernet interface, a synchronous digital hierarchy (SDH), a synchronous optical network (SONET), an optical supervisory channel (OSC), or an optical transport unit (OUT).

10. The method according to claim 1, wherein the first signal carries flexible Ethernet data received through a first optical transport unit (OUT) interface of the first network device.

11. The method according to claim 1, wherein any one of the at least one second signal carries overhead data received through a first optical transport unit (OUT) interface of the first network device;

any one of the at least one second signal carries data received through an optical supervisory channel (OSC) interface of the first network device; or any one of the at least one second signal carries data received through an Ethernet interface of the first network device.

12. An apparatus for determining a clock, the apparatus comprising:

a processor;

a memory coupled to the processor and storing program instructions that, upon execution by the processor, cause the apparatus to:

receive a first signal and at least one second signal, wherein the first signal carries data to be sent through a first flexible Ethernet interface;

determine a first physical layer clock based on the first signal; and determine a second physical layer clock based on the at least one second signal or the first physical layer clock and the at least one second signal, wherein the first physical layer clock or the second physical layer clock is used adopted as a sending clock of a non-flexible Ethernet interface, and wherein the apparatus comprises the first flexible Ethernet interface and the non-flexible Ethernet interface.

13. The apparatus according to claim 12, wherein the program instructions, upon execution by the processor, further cause the apparatus to:

determine the second physical layer clock based on a physical layer clock quality level associated with the at least one second signal; and/or determine the second physical layer clock based on a physical layer clock priority associated with the at least one second signal.

14. The apparatus according to claim 12, wherein the program instructions, upon execution by the processor, further cause the apparatus to:

determine the second physical layer clock based on a physical layer clock quality level associated with the first physical layer clock and a physical layer clock quality level associated with the at least one second signal; and/or determine the second physical layer clock based on a physical layer clock priority associated with the first physical layer clock and a physical layer clock priority associated with the at least one second signal.

15. The apparatus according to claim 12, wherein the program instructions, upon execution by the processor, further cause the apparatus to:

adopt the first physical layer clock or the second physical layer clock as the sending clock of the non-flexible Ethernet interface according to a configuration command.

16. The apparatus according to claim 12, wherein the program instructions, upon execution by the processor, further cause the apparatus to:

adopt the first physical layer clock or the second physical layer clock as the sending clock of the non-flexible Ethernet interface based on a physical layer clock quality level of the first physical layer clock and a physical layer clock quality level of the second physical layer clock; and/or adopt the first physical layer clock or the second physical layer clock as the sending clock of the non-flexible Ethernet interface based on a physical layer clock priority of the first physical layer clock and a physical layer clock priority of the second physical layer clock.

17. The apparatus according to claim 12, wherein the program instructions, upon execution by the processor, further cause the apparatus to:

adopt the first physical layer clock as a sending clock of the first flexible Ethernet interface.

18. The apparatus according to claim 12, wherein the apparatus is an edge device of an optical transport network, and the first signal comes from the optical transport network.

19. The apparatus according to claim 12, wherein a type of the first flexible Ethernet interface comprises a flexible Ethernet (FlexE), a slicing packet network (SPN), or a metro transport network (MTN).

20. A non-transitory computer-readable storage medium storing a computer program, wherein upon the computer program being executed by a computer, a method for determining a clock is implemented, the method comprising:

receiving, a first signal and at least one second signal, wherein the first signal carries data to be sent through a first flexible Ethernet interface;

determining, a first physical layer clock based on the first signal;

determining, a second physical layer clock based on the at least one second signal or the first physical layer clock and the at least one second signal; and adopting, the first physical layer clock or the second physical layer clock as a sending clock of a non-flexible Ethernet interface, wherein a first network device comprises the first flexible Ethernet interface and the non-flexible Ethernet interface.

* * * * *